US010735084B2

(12) United States Patent
Braun et al.

(10) Patent No.: US 10,735,084 B2
(45) Date of Patent: Aug. 4, 2020

(54) REDUNDANT WIRELESS COMMUNICATION SYSTEMS AND METHODS TO ENSURE RADIO SERVICE QUALITY UNDER ABNORMAL CONDITIONS

(71) Applicant: Andrew Wireless Systems GmbH, Buchdorf (DE)

(72) Inventors: Gerhard Braun, Ederheim (DE); Daniel Schwab, Gersthofen (DE); Markus Mederle, Tapfheim (DE); Andreas Biehler, Kaisheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 16/164,189

(22) Filed: Oct. 18, 2018

(65) Prior Publication Data

US 2019/0115972 A1    Apr. 18, 2019

Related U.S. Application Data

(60) Provisional application No. 62/573,836, filed on Oct. 18, 2017.

(51) Int. Cl.
*H04B 7/15* (2006.01)
*H04W 24/04* (2009.01)
(Continued)

(52) U.S. Cl.
CPC ........... *H04B 7/15* (2013.01); *H04B 7/15528* (2013.01); *H04W 24/04* (2013.01); *H04W 76/15* (2018.02); *H04W 88/08* (2013.01)

(58) Field of Classification Search
CPC . H04W 88/04; H04W 84/047; H04W 72/042; H04W 40/22; H04W 24/02; H04W 88/08; H04W 24/04; H04W 76/15
See application file for complete search history.

(56) References Cited

U.S. PATENT DOCUMENTS 10,171,159 B1 * 1/2019 Tailor ................. H04B 7/15507
2008/0232296 A1    9/2008 Shin et al.
(Continued)

OTHER PUBLICATIONS

International Searching Authority, "International Search Report and Written Opinion from PCT Application No. PCT/EP2018/078661 dated Jan. 28, 2019", from Foreign Counterpart to U.S. Appl. No. 16/164,189, dated Jan. 28, 2019, pp. 1-13, Published: US.

*Primary Examiner* — Keith Ferguson
(74) *Attorney, Agent, or Firm* — Fogg & Powers LLC

(57) ABSTRACT

A repeater with redundancy functions for a wireless communication system is provided. The repeater includes downlink repeater circuitry, uplink repeater circuitry, a detection function, at least one memory and a controller. The detection function is configured to detect conditions of communications between the base stations and the repeater. The at least one memory is used to store a primary configuration that sets out parameters for interfacing communications between the repeater and a primary base station of the base stations and at least one secondary configuration that sets out parameters for interfacing communications between the repeater and at least one secondary base station of the base stations and/or a secondary signal line of signal lines between the repeater and the primary base station. The controller is configured to implement the at least one secondary configuration to communicate with an associated secondary base station upon the detection function detecting abnormal communications between the repeater and the primary base station.

38 Claims, 11 Drawing Sheets

(51) Int. Cl.
  *H04W 76/15*   (2018.01)
  *H04B 7/155*   (2006.01)
  *H04W 88/08*   (2009.01)

(56) References Cited

U.S. PATENT DOCUMENTS

| | | | |
|---|---|---|---|
| 2010/0120356 A1* | 5/2010 | Jin | H04B 7/15535 455/7 |
| 2013/0336202 A1* | 12/2013 | Oh | H04B 7/155 370/315 |
| 2014/0038582 A1* | 2/2014 | Horneman | H04W 76/10 455/418 |
| 2014/0169263 A1* | 6/2014 | Stapleton | H04B 7/026 370/315 |
| 2015/0011157 A1* | 1/2015 | Terry | H04B 7/15535 455/10 |
| 2015/0147960 A1* | 5/2015 | Hanson | H04B 7/15528 455/23 |

\* cited by examiner

REDUNDANT WIRELESS COMMUNICATION SYSTEMS AND METHODS TO ENSURE RADIO SERVICE QUALITY UNDER ABNORMAL CONDITIONS

CROSS-REFERENCE TO RELATED APPLICATIONS

This application claims the benefit of U.S. Provisional Patent Application Ser. No. 62/573,836 filed on Oct. 18, 2017, which is hereby incorporated herein in its entirety by reference.

BACKGROUND

A repeater system (such as a distributed antenna system (DAS), a single-node repeater, a radio frequency (RF) repeater, etc.) is typically used to improve the wireless radio frequency (RF) coverage provided by one or more base stations. A repeater typically picks up and sends radio signals to a base station via antenna with a directional radio pattern. A repeater system typically includes one or more master units that are communicatively coupled with a plurality of remote antenna units, where each remote antenna unit can be coupled directly to one or more of the master units or indirectly via one or more other remote antenna units and/or via one or more intermediary or expansion units. A repeater is typically used to improve the coverage provided by one or more base stations that are coupled to the master units. These base stations can be coupled to the master units via one or more cables or via a wireless connection, for example, using one or more donor antennas. The wireless service provided by the base stations can include commercial cellular service and/or private or public safety wireless communications.

The use of repeaters provides added capacity as well as additional coverage. Safety-related RF systems are typically activated on demand or are operated continuously. The safety wireless capacity provided by a repeater and the associated base-station-related equipment during normal operations may not be sufficient in emergency situations (such as a fire or security event) due to the presence of many additional users of the safety wireless service. As a result, it is common to provision systems used for such safety applications with additional base stations and repeaters. In safety-related systems a redundant configuration must be activated in a short amount of time otherwise dropped calls may occur.

When planning for coverage within public safety relevant facilities by emergency services providers, the signal distributing infrastructure of the system may be shared between private and public safety services, each operating on their own frequency bands. For example, the assigned licensed bands for the German Public Safety Digital Radio (BDBOS) TETRA network in Germany are 380-385 MHz for uplink communications and 390-395 MHz in downlink communications. For private safety services, different bands are used. For example, 415-420 MHz may be used for uplink communications and 425-430 MHz may be used for downlink communications for private safety services. Public safety signals are usually used by government agencies, such as police or fire, and public safety coverage is available from base stations provided across large geographic regions (for example, nationwide coverage). Private safety signal coverage, in contrast, is usually found within specific facilities or other areas of private service responsibility, for example, for the use of facility operator.

A repeater system may be implemented as an "active" system in the sense that the downlink and uplink RF signals are amplified before being repeated. Active repeater systems can be used, for example, in sport stadiums, buildings (hotels, malls, or trade centers), metro stations and airports, trains, and tunnels. Each base station can be coupled to the repeater system via one or more cables or via a wireless connection, for example, using one or more donor antennas. Repeater systems can be used in other applications.

The capacity of each base station coupled to a repeater system may be dedicated to the repeater system. The capacity of each base station coupled to a repeater system can also be shared among the repeater system and a base station antenna system that is co-located with the base station and/or shared among the repeater system and one or more other repeater systems.

As discussed above, repeaters provide wireless communication coverage in buildings for commercial use and for public services, like rescue services. The repeater usually picks up the radio signal from a base station signal by an antenna with a directional radio pattern towards a specific base station. For public services, the coverage needs to be provided also in emergency situations or more generally under abnormal conditions, like fires or maintenance of the base station. A normal condition is defined for example, when the primary base station is on-duty and the primary signal line connecting the antenna with the repeater is undisturbed. An abnormal condition is defined for example, when the primary base station is off-duty due to maintenance, or the primary signal line is broken. Other abnormal condition examples may include a primary in-building signal path being broken, signal loss due to increase free space loss by obstacle and an antenna failure/damage/misalignment. Other abnormal conditions are possible.

SUMMARY

The following summary is made by way of example and not by way of limitation. It is merely provided to aid the reader in understanding some of the aspects of the subject matter described. Embodiments provide a wireless communication system that provides redundant communication between a repeater, primary base station and at least one secondary base station. In embodiments, a single repeater selectively implements stored configurations to establish alternative communications with a secondary base station or along secondary communication line to the primary base station when abnormal communications are detected between the repeater and the primary base station.

In one embodiment, a repeater with redundancy functions for a wireless communication system is provided. The repeater includes downlink repeater circuitry, uplink repeater circuitry, a detection function, at least one memory and a controller. The downlink repeater circuitry is used to interface communications from base stations to user equipment. The uplink repeater circuitry is used to interface communications from the user equipment to the base stations. The detection function is configured to detect conditions of communications between the base stations and the repeater. The at least one memory is used to store a primary configuration that sets out parameters for interfacing communications between the repeater and a primary base station of the base stations and at least one secondary configuration that sets out parameters for interfacing communications between the repeater and at least one secondary base station of the base stations. The controller is configured to implement the at least one secondary configuration to communicate with an associated secondary base station upon the detection function detecting abnormal communications between the repeater and the primary base station.

In another example embodiment, a repeater with redundancy functions for a wireless communication system is provided. The repeater includes downlink repeater circuitry, uplink repeater circuitry, a detection function, at least one memory and a controller. The downlink repeater circuitry is used to interface communications from base stations to user equipment. The uplink repeater circuitry is used to interface communications from the user equipment to the base stations. The detection function is configured to detect conditions of communications between the base stations and the repeater. The at least one memory is used to store a primary configuration that sets out parameters for interfacing communications between the repeater and a primary base station of the base stations along a primary communication link and at least one secondary configuration that set out parameters for interfacing communications between the repeater and the primary base station along a secondary communication link. The controller is configured to implement the at least one secondary configuration to communicate with the primary base station along the secondary communication link upon the detection function detecting abnormal communications on the primary communication link.

In another embodiment, a wireless communication system having redundancy functions is provided. The communication system includes a primary base station, at least one secondary base station, at least one antenna, at least one communication link and a repeater. The repeater includes downlink repeater circuitry, uplink repeater circuitry, a detection function, at least one memory and a controller. The downlink repeater circuitry is used to interface communications from one of the primary base station and the at least one secondary base station to user equipment. The uplink repeater circuitry is used to interface communications from the user equipment to one of the primary base station and the at least one secondary base station. The detection function is configured to detect conditions of communications between the repeater and the primary base station and the repeater and at least one secondary base station. The at least one memory is used to store a primary configuration and at least one secondary configuration. The primary configuration sets out parameters for interfacing communications between the repeater and the primary base station and the at least one secondary configuration sets out parameters for interfacing communications between the repeater and the at least one secondary base station. The controller is configured to implement the at least one secondary configuration upon the detection function detecting abnormal communications between the repeater and the primary base station. The at least one antenna is used to receive and transmit communications between the repeater and the primary base station and the repeater and the at least one secondary base station. The at least one communication link communicatively couples the at least one antenna to the repeater.

In another embodiment, a method of providing redundancy in a wireless communication system is provided. The method includes monitoring communications between a repeater and a primary base station of the wireless communication system. A secondary configuration is implemented with the repeater upon detection of a switching condition indicating abnormal communications between the repeater and the primary base station. Moreover, communications between the repeater and the wireless communication system are established via second communication link upon the implementation of the secondary configuration.

In yet another embodiment, a method of operating a redundancy wireless communication system is provided. The method includes monitoring communications between a repeater and a primary base station of the wireless communication system. A secondary configuration is implemented with the repeater upon detection of a switching condition indicating abnormal communications between the repeater and the primary base station on a primary communication line. Communications between the repeater and the primary base station is established pursuant to the implementation of the secondary configuration by the repeater using a secondary communication line.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
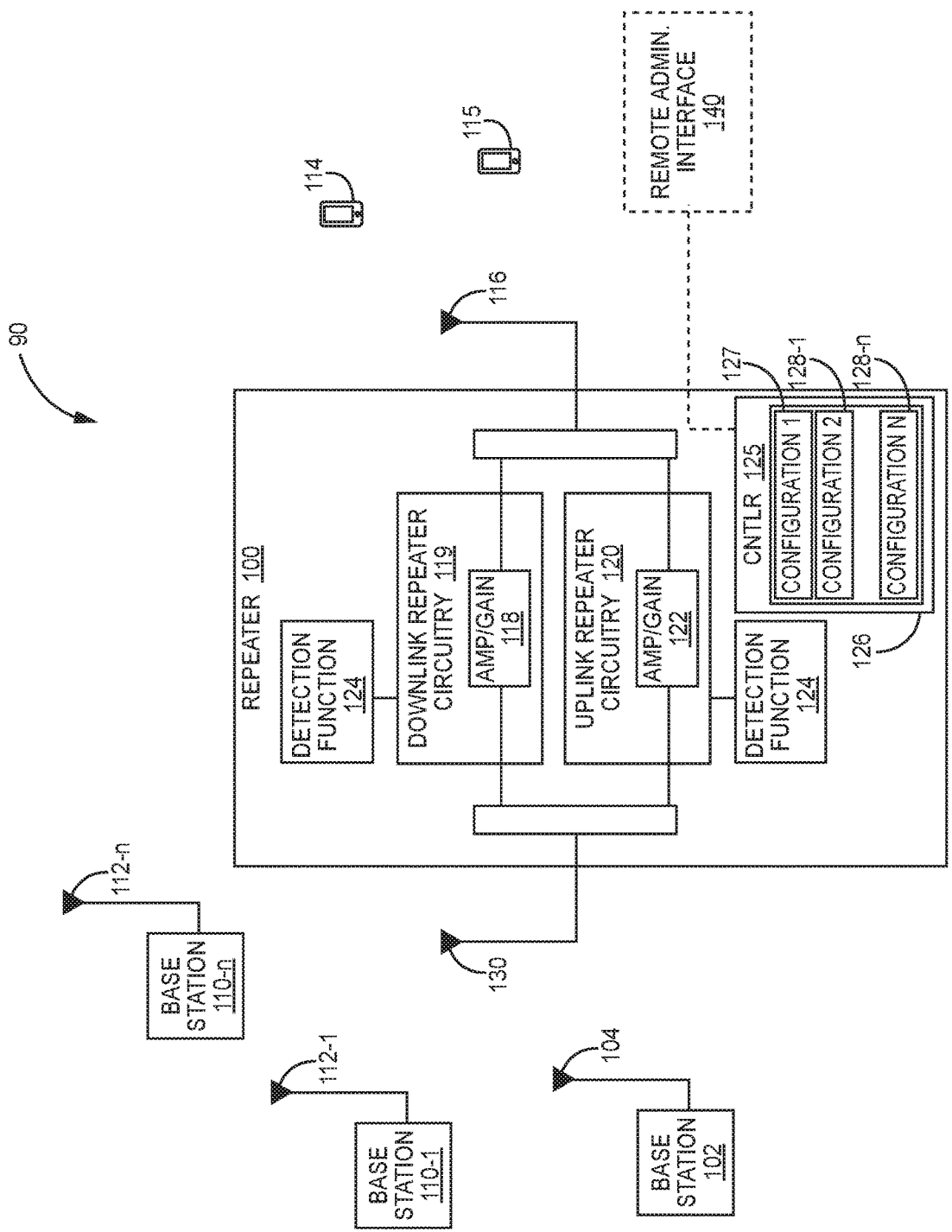
FIG. 1 is a block diagram of a wireless communication system having redundancy function according to one exemplary embodiment.

Embodiments provide a wireless communication system with a redundant function for coverage in a building or similar coverage area. Embodiments employ a single repeater having at least one redundancy configuration that is designed to communicate with an auxiliary (secondary) base station (or along a secondary communication link that may or may not include a secondary base station) when a main (primary) base station (or primary communication line) is unavailable. Switching from one configuration to the other in embodiments happen within a very short time and thus provide uninterrupted wireless service within a building. Referring to FIG. 1, an example of a wireless communication system 90 having redundancy functions of an embodiment is illustrated. The communication system 90 in this example includes a single repeater 100, a primary base station 102, secondary base stations 110-1 through 110-n, antennas 130 and 116 and user equipment 114 and 115. The primary base station 102 includes a first base station antenna 104 that is in communication with the repeater 100 via antenna 130. In this example, antenna 130 is used to communicate with the secondary base stations 110-1 through 110-n via respective secondary antennas 112-1 through 112-n. Moreover, antenna 116 is used to communicate with user equipment 114 and 115 such as, but not limited to, mobile communication devices. The repeater 100 interfaces communications between the respective base stations 102, 110-1 through 110-n and the user equipment 114 and 115.

The repeater 100 in this example is illustrated as including downlink repeater circuitry 119 and unlink repeater circuitry 120. In general, the downlink repeater circuitry 119 is configured to receive one or more downlink signals from one or more base stations 102 and 110-1 through 110-n. These signals are also referred to here as "base station downlink signals." Each base station downlink signal includes one or more radio frequency channels used for communicating in the downlink direction with the User Equipment (UE) 114 and 115 over the relevant wireless air interface. Typically, each base station downlink signal is received as an analog radio frequency signal, though in some embodiments one or more of the base station signals are received in a digital form (for example, in some repeater systems implemented as a digital DAS, one or more of the base station downlink signals are received in a digital baseband form complying with, for example, the Common Public Radio Interface ("CPRI") protocol, Open Radio Equipment Interface ("ORP") protocol, the Open Base Station Standard Initiative ("OBSAI") protocol, or other protocol).

The downlink repeater circuitry 119 in the repeater system 100 is also configured to generate one or more downlink radio frequency signals that are radiated from one or more coverage antennas 116 associated with repeater system 100 for reception by UE 114 and 115. These downlink radio frequency signals are analog radio frequency signals and are also referred to here as "repeated downlink radio frequency signals." Each repeated downlink radio frequency signal includes one or more of the downlink radio frequency channels used for communicating with UE 114 and 115 over the wireless air interface. In this exemplary embodiment, the repeater 100 is an active repeater system in which the downlink repeater circuitry 119 comprises one or more amplifiers (or other gain elements) 118 that are used to control and adjust the gain of the repeated downlink radio frequency signals radiated from the one or more coverage antennas 116.

Also, the repeater 100 comprises uplink repeater circuitry 120 that is configured to receive one or more uplink radio frequency signals transmitted from the UE 114 and 115. These signals are analog radio frequency signals and are also referred to here as "UE uplink radio frequency signals." Each UE uplink radio frequency signal includes one or more radio frequency channels used for communicating in the uplink direction with user equipment 114 and 115 over the relevant wireless air interface.

The uplink repeater circuitry 120 in the repeater 100 is also configured to generate one or more uplink radio frequency signals that are provided to the one or more base stations 102 and 110-1 through 110-n. These signals are also referred to here as "repeated uplink signals." Each repeated uplink signal includes one or more of the uplink radio frequency channels used for communicating with UE 114 and 115 over the wireless air interface. In this exemplary embodiment, the repeater 100 is an active repeater system in which the uplink repeater circuitry 120 comprises one or more amplifiers (or other gain elements) 122 that are used to control and adjust the gain of the repeated uplink radio frequency signals provided to the one or more base stations 102 and 110-1 through 110-n.

Typically, each repeated uplink signal is provided to the one or more base stations 102 and 110-1 through 110-n as an analog radio frequency signal, though in some embodiments one or more of the repeated uplink signals are provided to the one or more base stations 102 and 110-1 through 110-n in a digital form (for example, in some repeater systems implemented as a digital DAS, one or more of the repeated uplink signals are provided to one or more base stations 102, 110 in a digital baseband form complying with, for example, the CPRI protocol, ORI protocol, the OBSAI protocol, or other protocol).

The downlink repeater circuitry 119 and uplink repeater circuitry 120 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink repeater circuitry 119 and uplink repeater circuitry 120 may share common circuitry and/or components.

The repeater 100 is configured to implement a detection function 124 that monitors communications between the repeater 100 and a base station. In an embodiment, the detection function may quantify a power level of signals received at the repeater 100 in either or both of the uplink or downlink. In one embodiment, the detection function 124 may be implemented to separately detect and quantify the received power for the relevant downlink and uplink frequency bands for each base station 102 and 110-1 through 110-n associated with the repeater 100. The detection function 124 can be implemented in other ways as further described below in detecting normal and abnormal communications.

The repeater 100 of the example embodiment includes a controller 125 and memory 126. The memory 126 stores operating instructions implemented by the controller 125. The memory 126 further stores operating configurations that enables communications between the repeater 100 and base stations. In the example of FIG. 1, the memory 126 includes a first (or primary) configuration 127 for communications the primary base station 102 and secondary configurations 128-1 through 128-n for communication with secondary base stations 110-1 through 110-n. In some embodiments, at least one of the secondary configuration sets parameters for switching a communication link to at least one antenna as described in detail below. Information stored relating to the primary configuration 127 and the secondary configurations 128-1 through 128-n may include parameters such as a set of frequencies, gain values, conjugated parameters, relay status and descriptions used for respective configurations to enable communication between the repeater 100 and the respective base station 102 and 110-1 through 110-n.

In some embodiments, as discussed in detail below, the detection function 124 is used to detect abnormal communications between the repeater 100 and the base stations 102, 110-1 through 110-n. The controller 125 of the repeater system 100 causes the repeater 100 to switch over to one of the secondary base stations 110-1 through 110-n upon the detection of abnormal communication with the primary base station 102 using a respective second configuration 128-1 through 128-n to set up communications with the respective secondary base station 110-1 through 110-n. In an embodiment, upon detection by the detection function 124 that normal communications with the primary base station 102 are restored (for example when the primary base station is brought back on line), the controller 125 of the repeater 100 may automatically switch back to communicating with the primary base station 102 implementing the primary configuration 127.

In general, the controller 125 may include any one or more of a processor, microprocessor, a digital signal processor (DSP), an application specific integrated circuit (ASIC), a field program gate array (FPGA), or equivalent discrete or integrated logic circuitry. In some example embodiments, controller 125 may include multiple components, such as any combination of one or more microprocessors, one or more controllers, one or more DSPs, one or more ASICs, one or more FPGAs, as well as other discrete or integrated logic circuitry. The functions attributed to the controller 125 herein may be embodied as software, firmware, hardware or any combination thereof. The controller may be part of a system controller or a component controller.

The memory 126 may include computer-readable operating instructions as discussed above that, when executed by the controller 125 provides functions of the repeater system 100. Such functions may include the functions of switching communications between a primary base station and secondary base station as described above. The computer readable instructions may be encoded within the memory 126. Memory 126 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The communication system 90 may include a remote administration interface 140 that is in communication with the controller 125 of the repeater 100 as illustrated in FIG. 1. In an embodiment, a current configuration of the repeater 100 is conveyed to the remote administrative interface 140. Further in an embodiment, the remote administrative communication device 140 allows for the remote control the switching between the primary and secondary configurations 127 and 128-1 through 128-n. Further in an embodiment, the remote administrative interface 140 is capable uploading new configurations on the repeater system in case frequency planning is changed by a network operator. This allows for a reduction in service costs since no local access is needed to load up new configurations.

Figure 2:
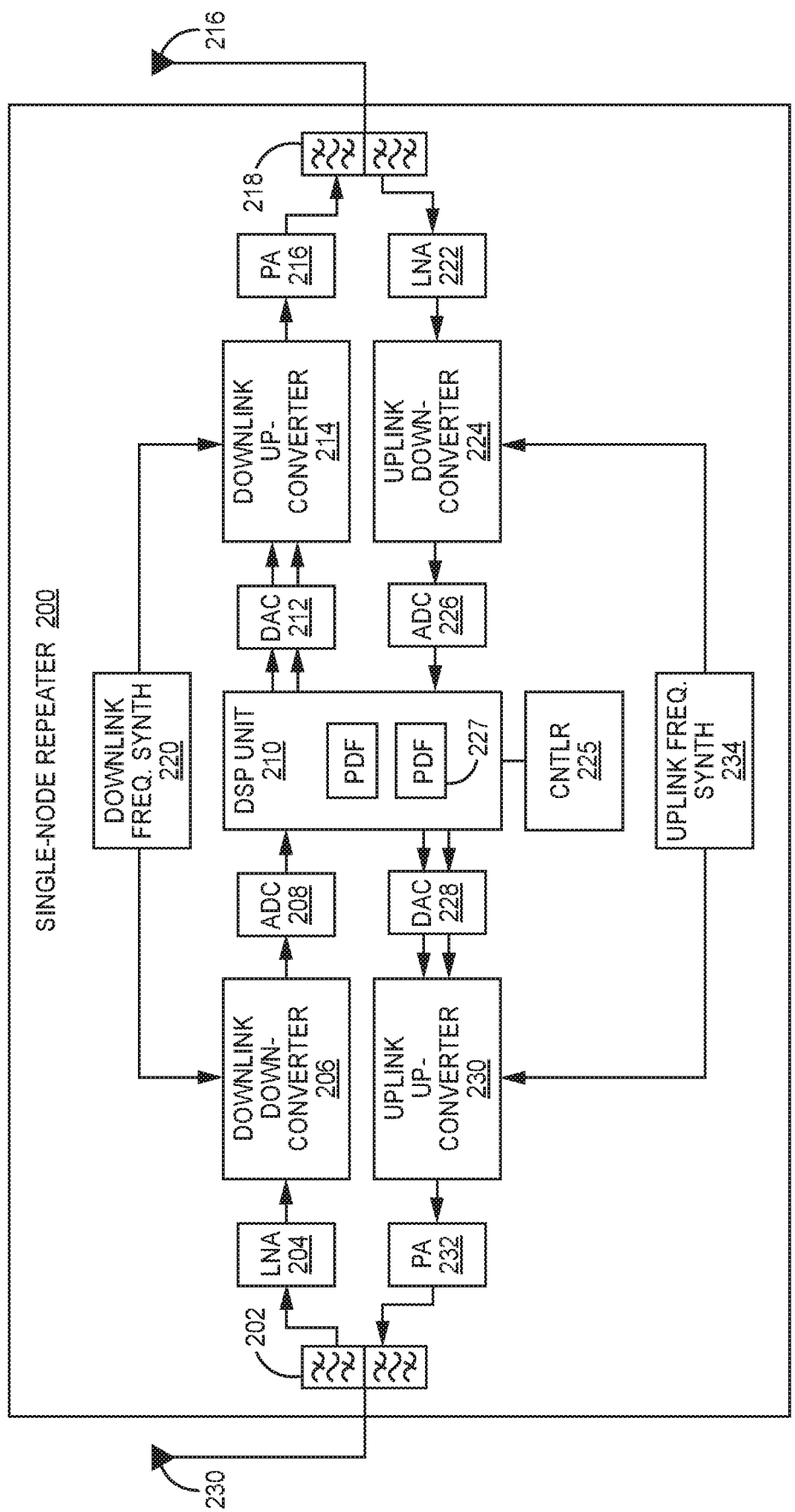
FIG. 2 is a block diagram of a repeater according to one exemplary embodiment.

A more detailed example of a single-node repeater 200 of another exemplary embodiment is illustrated in FIG. 2. The single-node repeater 200 is in communication with at least a primary base station (such as base station 102 of FIG. 1) or secondary base station (such as one of the base stations 110-1 through 110-n of FIG. 1) via first donor antenna 230. A second antenna 216 is used to receive and transmit signals to UE (such UE 114 and 115 of FIG. 1). The single-node repeater 200 of this example embodiment comprises a first duplexer 202 having a common port that is coupled to the donor antenna 230 via cable.

The single-node repeater 200 further comprises a low noise amplifier (LNA) 204 that is coupled to a downlink port of the first duplexer 202. The first duplexer 202 receives downlink signals from a base station (such as base station 102 and 110 of FIG. 1) via the donor antenna 230 and outputs the received downlink signals to the LNA 204 via its downlink port. The LNA 204 amplifies the base station downlink signals.

The single-node repeater 200 further comprises a downlink down-converter 206 that is coupled to the output of the LNA 204. The downlink down-converter 206 filters and down-converts the amplified downlink signals and outputs a down-converted downlink signal.

The single-node repeater 200 further comprises a downlink analog-to-digital converter (ADC) 208 that is configured to digitize the down-converted downlink signal to produce real downlink digital samples indicative of the down-converted downlink signal (and the corresponding originally received downlink signal).

The single-node repeater 200 further comprises a digital signal processor (DSP) unit or circuit 210. The DSP unit 210 is configured to digitally down-convert the real downlink digital samples to produce baseband digital in-phase and quadrature samples (IQ samples). These downlink digital IQ samples can also be filtered, amplified, attenuated, and/or re-sampled or decimated to a lower sample rate.

In the exemplary embodiment shown in FIG. 2, the downlink down-converter 206 and downlink ADC 208 are configured to produce real digital samples for a relatively wide frequency band. In this embodiment, the DSP unit 210 is configured to digitally filter the real digital samples to produce downlink digital IQ samples for a relatively narrow frequency band (also referred to here as a "downlink sub-band"), where the resulting downlink digital IQ samples for the downlink sub-band are then digitally amplified and/or otherwise digitally processed. In this way, the particular downlink sub-band that the single-node repeater 200 repeats, as well as the applied gain and/or other digital processing, can be configured via software. In this embodiment, the DSP unit 210 is configured to do this for multiple downlink sub-bands.

Figure 3A:
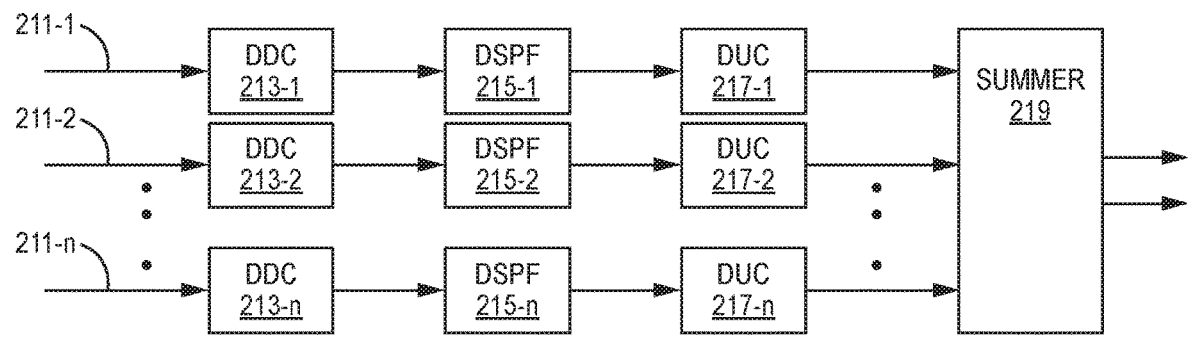
FIG. 3A is a block diagram illustration the processing of multiple downlink sub-bands with a DSP unit according to one exemplary embodiment.

The DSP unit 210 (more specifically, the software executing on the DSP unit 210) is configured to process multiple downlink sub-bands. An illustration of this is provided in FIG. 3A. In this example, in each sub-band has an associated downlink signal path 211-1 through 211-n. The signal path for each downlink sub-band comprises a digital down-converter (DDC) 213-1 through 213-n that digitally down-converts and filters the wideband real digital samples output by the ADC 208 in order to produce baseband downlink digital IQ samples for the associated downlink sub-band. The signal paths 211-1 through 211-n for each downlink sub-band also comprises one or more digital signal processing functions 215-1 through 215-*n* that adjust the gain (and/or otherwise digitally process) of the downlink sub-band signals.

The signal paths 211-1 through 211-*n* for each downlink sub-band further include digital up-converters (DUCs) 217-1 through 217-*n* that digitally upconvert the processed baseband downlink digital IQ samples and produces upconverted wideband downlink digital IQ samples for all the downlink sub-bands. The upconverted wideband downlink digital IQ samples are then digitally summed using summer 219. The resulting summed wideband downlink digital IQ samples are output from the DSP unit 210. The settings used in each downlink signal path 211-1 through 211-*n* are software configurable. For example, the frequency range for each downlink sub-band and the gain adjustment or other signal processing can be changed via such settings. As discussed above, in embodiments, a controller changes the frequency range and gain adjustments in each sub-band when switching between a primary and secondary base station.

The summed wideband downlink digital IQ samples output by the DSP unit 210 and provided to a downlink digital-to-analog converter (DAC) 212 that is included in the single-node repeater 200 as illustrated in FIG. 2. The downlink DAC 212 produces analog in-phase and quadrature signals that are output to a downlink analog up-converter 214 that is included in the single-node repeater 200. The downlink analog up-converter 214 quadrature modulates the analog in-phase and quadrature signals to produce a real analog signal, which it up-converts to the desired RF frequency. The downlink analog up-converter 214 also filters the downlink analog radio frequency signal.

The single-node repeater 200 further comprises a downlink power amplifier (PA) 216, which power amplifies the downlink analog radio frequency signal. The amplified downlink analog radio frequency signal is provided to a coverage antenna 216 associated with the single-node repeater 200 via a second duplexer 218, from which the amplified analog radio frequency signal is radiated to any user equipment (such as user equipment 114 and 115 of FIG. 1) that is in the coverage area of the single-node repeater 200.

The single-node repeater 200 further comprises a downlink frequency synthesizer 220 that is configured to generate a local oscillator signal used by the downlink down-converter 206 and the downlink up-converter 214.

The single-node repeater 200 further comprises an uplink low noise amplifier (LNA) 222 that is coupled to an uplink port of the second duplexer 218. The second duplexer 218 receives any UE uplink radio frequency signals from any active user equipment 114, 115 via the associated coverage antenna 216 and outputs the received uplink signal to the LNA 222 via its uplink port. The LNA 222 amplifies the received uplink signals.

The single-node repeater 200 further comprises an uplink analog down-converter 224 that is coupled to the output of the LNA 222. The uplink analog down-converter 224 filters and down-converts the amplified uplink signals and outputs a down-converted uplink signal.

The single-node repeater 200 further comprises an uplink analog-to-digital converter (ADC) 226 that is configured to digitize the down-converted uplink signal to produce real downlink digital samples indicative of the down-converted uplink signal (and the corresponding originally received uplink signal).

In the exemplary embodiment shown in FIG. 2, the same DSP unit 210 is used for both downlink and uplink digital processing (though it is to be understood that separate DSP units could be used). The DSP unit 210 is configured to digitally down-convert the real uplink digital samples to produce baseband digital in-phase and quadrature samples. These uplink digital IQ samples can also be filtered, amplified, attenuated, and/or re-sampled or decimated to a lower sample rate.

In the exemplary embodiment shown in FIG. 2, the uplink down-converter 224 and uplink ADC 226 are configured to produce real digital samples for a relatively wide frequency band. In this embodiment, the DSP unit 210 is configured to digitally filter the real digital samples to produce uplink digital IQ samples for a relatively narrow frequency band (also referred to here as a "uplink sub-band"), where the resulting uplink digital IQ samples are then digitally amplified and/or otherwise digitally processed. In this way, the particular uplink sub-band that the single-node repeater 200 repeats, as well as the applied gain and/or other digital processing, can be configured via software. In this embodiment, the DSP unit 210 is configured to do this for multiple uplink sub-bands.

Figure 3B:
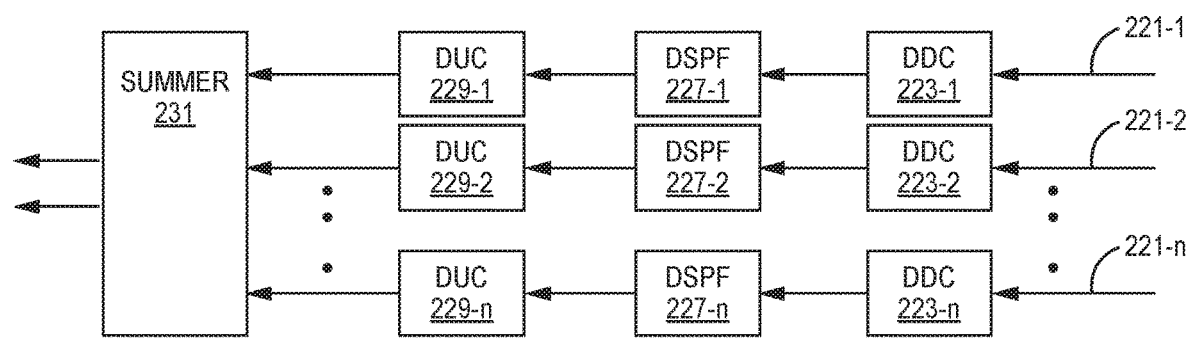
FIG. 3B is a block diagram illustration the processing of multiple uplink sub-bands with the DSP unit according to one exemplary embodiment.

In particular, the DSP unit 210 of the example of FIG. 2 (more specifically, the software executing on the DSP unit 210) is configured to process multiple uplink sub-bands as illustrated in FIG. 3B. In this example, in each sub-band has an associated uplink signal path 221-1 through 221-*n*. The signal path for each uplink sub-band comprises a digital down-converter (DDC) 223-1 through 221-*n* that digitally down-converts and filters the wideband real digital samples output by the ADC 226 to produce baseband uplink digital IQ samples for the associated uplink sub-band. The signal path 221-1 through 221-*n* for each uplink sub-band also comprises one or more digital signal processing functions 227-1 through 227-*n* that adjust the gain of (and/or otherwise digitally process) the uplink sub-band signals.

The signal paths 221-1 through 221-*n* for each uplink sub-band also comprises a digital up-converter (DUC) 229-1 through 229-*n* that digitally upconverts the processed baseband uplink digital IQ samples and produces upconverted wideband uplink digital IQ samples for the samples for all the uplink sub-bands are then digitally summed using summer 231, and the resulting summed wideband uplink digital IQ samples are output from the DSP unit 210. The settings used in each uplink signal path 221-1 through 221-*n* are software configurable. For example, the frequency range for each uplink sub-band and the gain adjustment or other signal processing can be changed via such settings.

The summed wideband uplink digital IQ samples output by the DSP unit 210 are provided to an uplink digital-to-analog (DAC) converter 228 that is included in the single-node repeater 200 as illustrated in FIG. 2. The uplink DAC 228 produces analog in-phase and quadrature signals that are output to an uplink analog up-converter 230 that is included in the single-node repeater 200. The uplink up-converter 230 quadrature modulates the analog in-phase and quadrature signals to produce a real analog signal, which it up-converts to the desired RF frequency. The uplink up-converter 230 also filters the uplink analog radio frequency signal.

The single-node repeater 200 further comprises an uplink power amplifier (PA) 232, which power amplifies the uplink analog radio frequency signal. The amplified uplink analog radio frequency signal is provided to the donor antenna 230 via the second duplexer 202.

The single-node repeater 200 further comprises an uplink frequency synthesizer 234 that is configured to generate a local oscillator signal that is used by the uplink down-converter 224 and the uplink up-converter 230.

The single-node repeater 200 further comprises a controller 225. The controller 225 is implemented using one or more programmable processors that execute software that is configured to implement various features described here as being implemented by the controller 225 (or the single-node repeater 200 more generally). The controller 225 (more specifically, the various features described here as being implemented by the controller 225 or the single-node repeater 200) (or portions thereof) can be implemented in other ways (for example, in a field programmable gate array (FPGA), application specific integrated circuit (ASIC), etc.).

In the exemplary shown in FIG. 2, the detection function 227 can be implemented in the DSP unit 210 to determine a received power level for the original uplink radio frequency signal received by the single-node repeater 200. The DSP unit 210 can determine the received power level based on the digital samples generated from the original uplink radio frequency signal received by the single-node repeater 200. In one embodiment, the detection function is used to determine if a base station is offline. In further another embodiment, other methods of determining the presence and strength of a signal is used to determine if a base station is offline. The controller 225 implements first or second configuration instructions stored in memory when switching between a primary and secondary base station.

The single-node repeater can be implemented in other ways (for example, where no digital signal processing is performed in the downlink and uplink repeater circuitry and instead only analog filtering and amplification is used).

Figure 4:
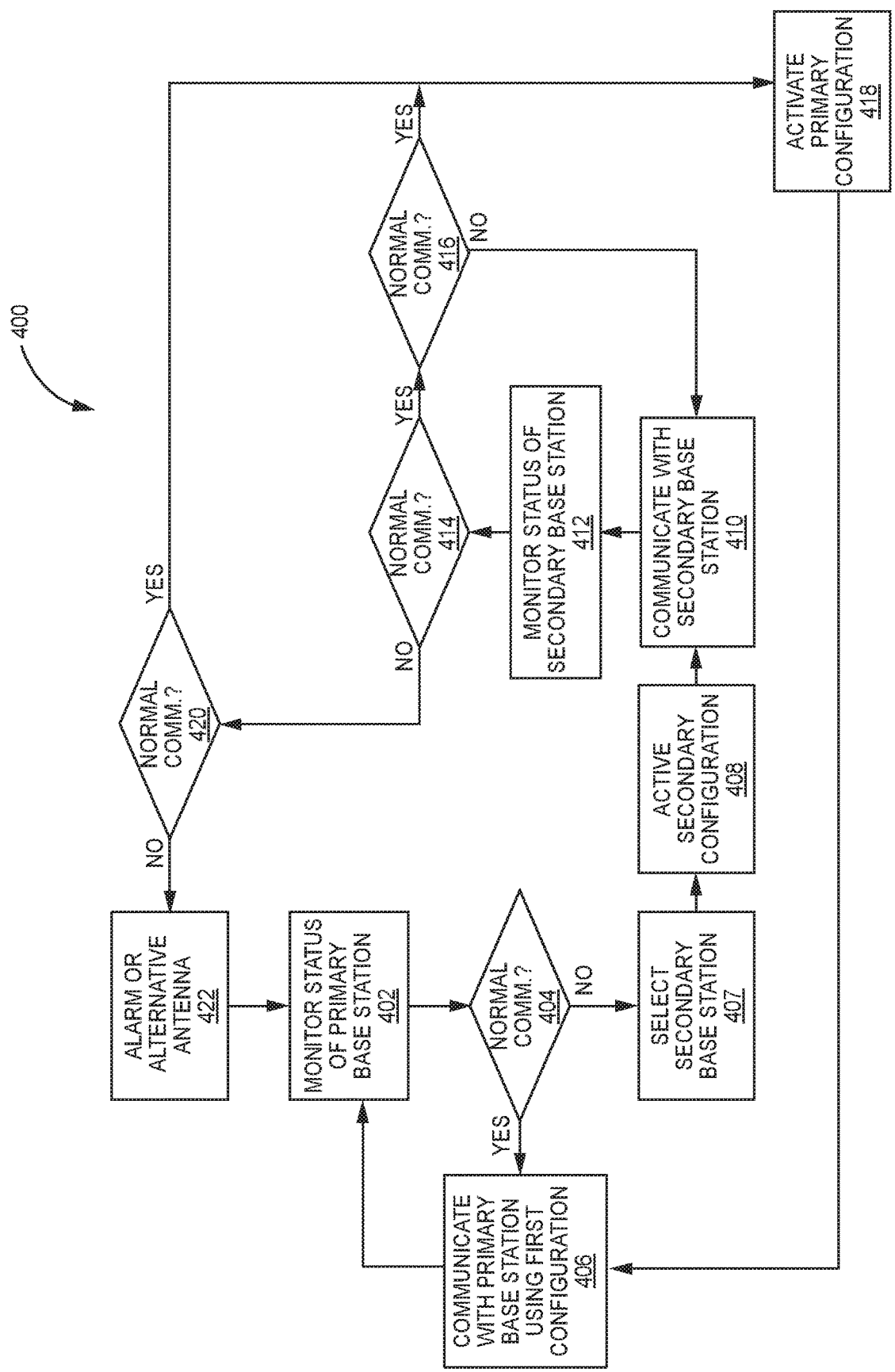
FIG. 4 illustrates a redundancy flow diagram according to one exemplary embodiment.

Referring to FIG. 4, a redundancy flow diagram 400 of an exemplary embodiment is illustrated. Flow diagram 400 is provided as a series of steps or blocks. The blocks in FIG. 4 are provided in a sequential order. However, the sequential order is just an example. Other sequences are possible and anticipated. Hence embodiments are not limited to the sequence of blocks set out in FIG. 4. In the example of FIG. 4, at block (402) the status of a primary base station is monitored. If it is determined at block (404) that normal communications between the repeater and the primary base station is occurring or available, communications between the repeater and the primary base station is maintained at block (406). One method of determining if normal communication between the repeater and the primary base station is available is by monitoring signals from the primary base station. In one embodiment, this may be done with a detection function.

A detection of an abnormal communication condition between the repeater and the primary base station at block (404) leads to a switching condition. A switching condition, in an embodiment, may be based on a Receive Signal Strength Indicator (RSSI) band measured by the detection function being less than a set RSSI threshold. The RSSI band is a RSSI measurement for the whole frequency band in the primary configuration. There are other RSSI measurements possible. For example, the RSSI may be detected for a pilot channel, but different mobile communication standards could require different type of RSSI measurements. Therefore, the term "RSSI measurement" is not limited to a specific measurement method, and a specific mobile communication standard. RSSI generally describes a measurement value which gives a clear indication if specific base station including the signal line on which the repeater is connected to the antenna, performs their intended tasks. The method to distinguish a normal condition from an abnormal condition, as described above, is not limited to a RSSI measurement. For example, methods may include measurements of the signal line integrity such as Voltage Standing Wave Ratio (VSWR) measurement, a signal-to-noise-ratio measurement or the measurement of a RF relay status as provided by the detection function. Hence, embodiments are not limited to the types of measurements used as a switching condition for switching between base stations.

If it is determined that the communication between the repeater and primary base station is abnormal at block (404), the repeater selects a secondary base station to communicate with block (407). In one embodiment, the secondary base stations are ranked. Higher ranked secondary base stations that are online and can provide normal communications are selected first. The secondary configuration associated with the selected secondary base station is activated at block (408). As discussed above, in one embodiment the implementation of the secondary configuration is achieved with a controller implementing secondary configuration instructions that are stored in a memory to allow communication between the repeater and the select secondary base station. The secondary configuration instructions may include information on frequencies, gains values, relay status, etc. that allow normal communications between the repeater the selected secondary base station. At block (410) the repeater communicates with the secondary base station to provide interface functions between the UE and the selected secondary base station.

The communication status with the selected secondary base station is monitored at block (412). If it is determined that communication between the repeater and second base station is normal at block (414), it is then determined at block (416) whether the primary base station is once again able to provide normal communications. If it is determined at block (416) that the primary base station can provide normal communications, the primary configuration is activated at block (418) and the process continues at block (406) communicating with the primary base station using the first configuration.

If it determined at block (416), that communications with the primary base station is still not available, the communication with the secondary base station is maintained at block (410) and the process continues. If it determined at block (414) that the secondary base station is no longer able to provide normal communications, it is then determined at block (420) whether the primary base station is once again able to provide normal communications. If it is determined at block (420) that the primary base station can provide normal communications, the primary configuration is activated at block (418) and the process continues at block (406) communicating with the primary base using the first configuration. If, however, it is determined at block (420) that the primary base station still cannot provide normal communications, an alarm is activated or an alternative antenna is activated at block (422). The process then continues at block (402).

In the redundancy flow diagram 400 of an exemplary embodiment, the switching between the primary and secondary base stations is preformed either automatically or manually. Moreover, in an embodiment, the switch over may be partially automatic and partially manual. For example, the switching from the primary base station to the secondary base station upon detection of abnormal communications between the primary base station and the repeater may be automatic while the switching back to the primary base station may be manual. In one embodiment, the manual switch may be done via remote administration interface.

Hence, in some embodiments, the repeater continues measuring the RSSI (or other indictor) on both primary and secondary configurations regularly. This may occur within sub-second intervals. In addition, in an embodiment with a secondary configuration being active, a controller of the repeater may continuously monitor just specific channels or different channels at different times in the background. In addition, the monitoring may not only determine indicators that a switching condition is present as explained above, but also may predetermine additional system parameters such as gain, to allow for an optimum radio service quality in the service area, in case an abnormal condition is present or the system resumes to a normal condition.

In addition, as discussed above, embodiments are not limited to two configurations but may include different configurations which can be handled with different priorities. In addition, some embodiments that employ a higher-ranking configuration system, when a higher-ranking base station comes back online or the disturbance of the higher-ranking signal line is resolved, embodiments automatically reactivate the higher-ranking configuration.

Embodiments are not limited to only perform operations on the repeater configurations. Some embodiments allow for the transmitting of signal to external switching devices, such as RF relays, to perform additional tasks like transfer switching of communication lines as discussed further below. Additionally, embodiments of the repeater transmit the status, e.g. normal condition/abnormal condition via a separate communication channel to additional network elements, such as a remote administration interface. Moreover, some embodiments allow for the receiving of control signals from the remote administration interface to perform specific tasks about upcoming abnormal conditions, such as a scheduled maintenance of the primary base station. Another feature of an embodiment is to control the switching status of any connected switching device, such as a RF relay. If the switching status is not equivalent to the emitted switching command, an embodiment can use this information as another indication that an abnormal condition is present.

Figure 5A:
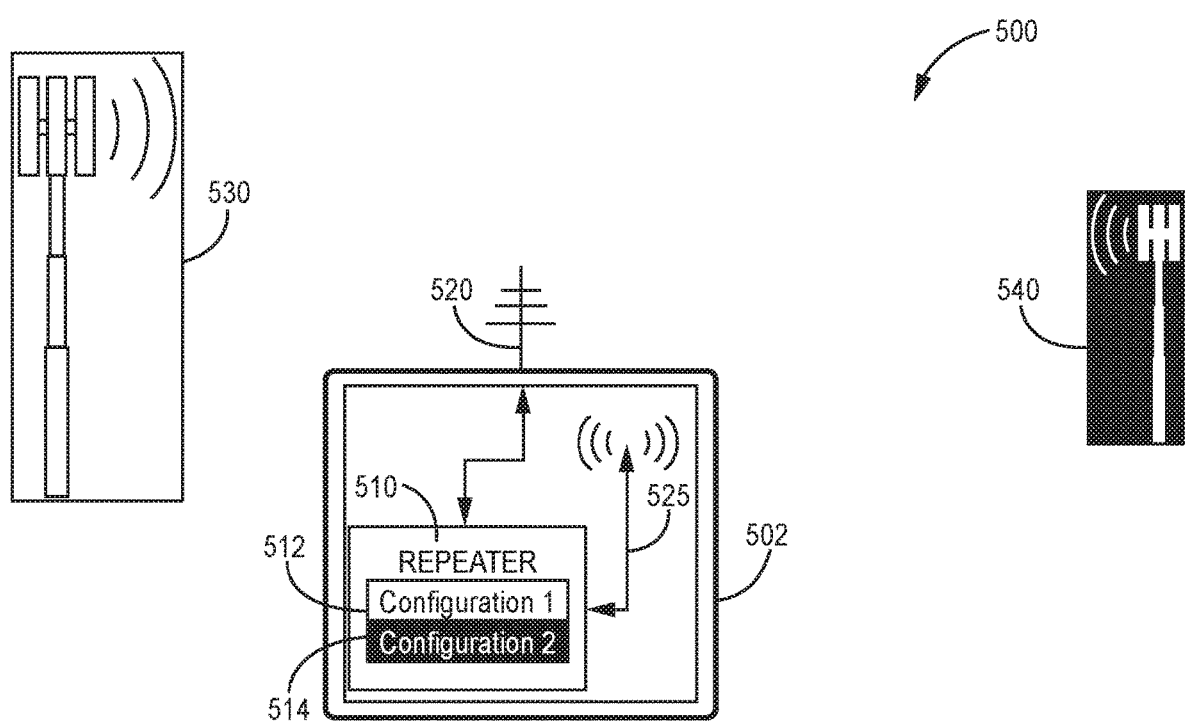
FIG. 5A illustrates a redundant communication system implementing a normal primary configuration according to one exemplary embodiment.

Examples of different redundant wireless communication systems employing a repeater with first and second configurations to selectively communicate with a primary base station and a secondary base station are illustrated in FIGS. 5A through 7D. FIG. 5A illustrates a redundancy communication system 500 of a first exemplary embodiment. In the redundancy communication system 500, a repeater 510 is housed within a building 502. The repeater 510 includes a first (primary) configuration 512 used to communicate with a primary base station 530 and a secondary configuration 514 used to communicate via secondary communication link. The secondary communication link in this embodiment includes a secondary base station 540. In this example embodiment, one antenna 520 is used to communicate with both the primary base station 530 and the secondary base station 540. The antenna 520 in this example embodiment has preferably no directionality.

The Example of FIG. 5A illustrates normal conditions with the primary base station being online (or on duty) having normal communications with the repeater 510. In FIG. 5A, the repeater 510 is in communication with the primary base station 530 using the primary configuration 512 as indicated by configuration indication 525. As discussed above, the primary and secondary configurations 512 and 514 use different frequencies and gain settings for the different base stations. In this embodiment, there is only a single signal line (or communication line) from the antenna 520 to the repeater 510. If an abnormal condition is present with the primary base station 530, the repeater 510 communicates with the secondary base station 740.

Figure 5B:
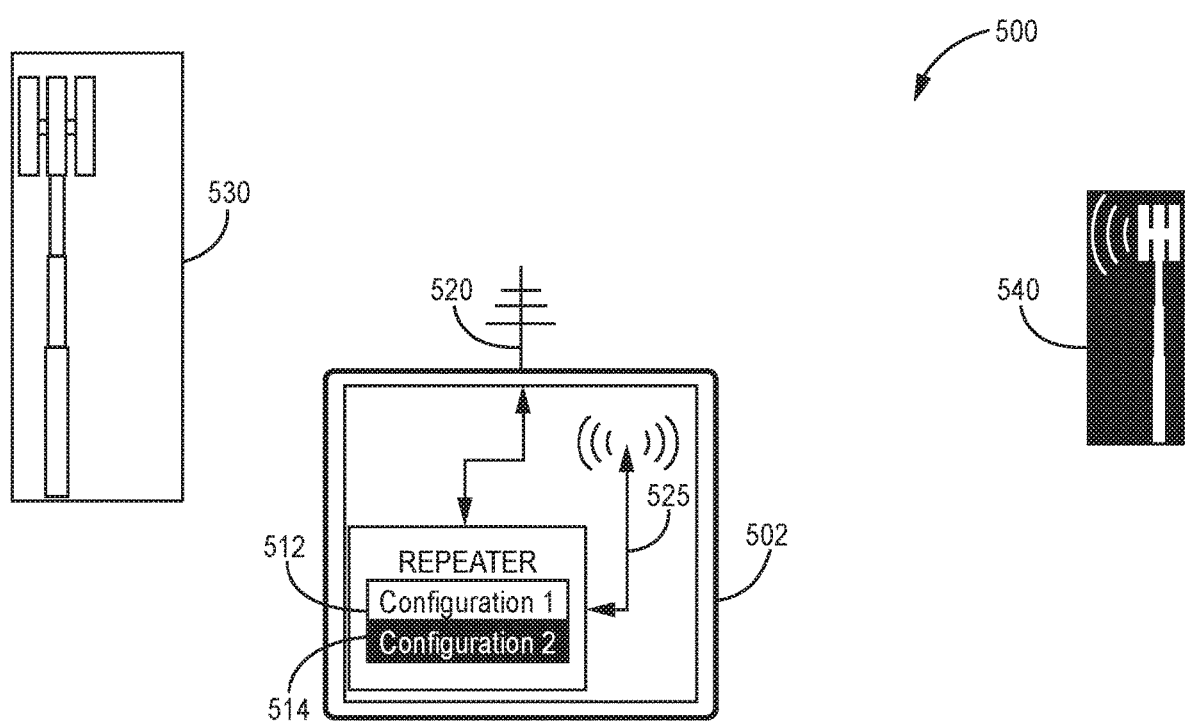
FIG. 5B illustrates the redundant communication system of FIG. 5A implementing a secondary configuration according to one exemplary embodiment.

FIG. 5B illustrates redundancy communication system 500 where the primary base station 530 is offline (or off duty) and the secondary base station 540 is online via the repeater 510 activating the second configuration 514 as indicated by configuration indication 525.

Figure 6:
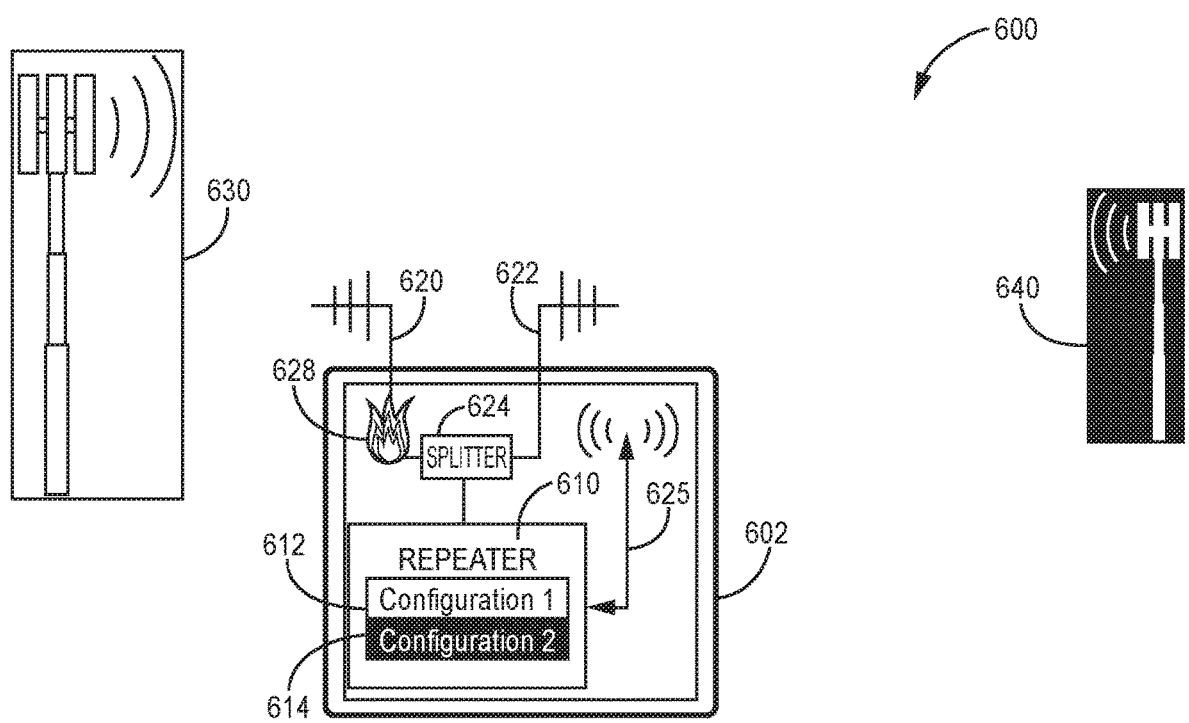
FIG. 6 illustrates another redundant communication system with a splitter implementing a secondary configuration according to one exemplary embodiment.

FIG. 6 illustrates a redundancy communication system 600 of another exemplary embodiment. In redundancy communication system 600, a repeater 610 is housed within a building 602. The repeater 610 includes a primary configuration 612 used to communicate with a primary base station 630 and a secondary configuration 614 used to communicate with a secondary base station 640. In this example embodiment, two antennas are used. A first antenna 620 is directed to communicate with the primary base station 630 and a second antenna 622 is directed to communicate with the secondary base station 640. A splitter 624 provides communications between the repeater 610 and the antennas 620 and 622. The Example of FIG. 6 illustrates a fire 628 that disrupts communications between the splitter 624 and the first antenna 620 disrupting communication between the repeater 610 and the primary base station 630. In this situation, the repeater 610 implements the secondary configuration 614, as indicated by configuration indication 625, to communicate with the secondary base station 640 via the second antenna 622. In an alternative embodiment, two signal lines are simply run from the repeater 610 to the antennas 620 and 622 with a splitter positioned within the repeater 610. This embodiment provides two independent paths from the repeater 610 through the building 602 which may be desired for redundancy.

Figure 7A:
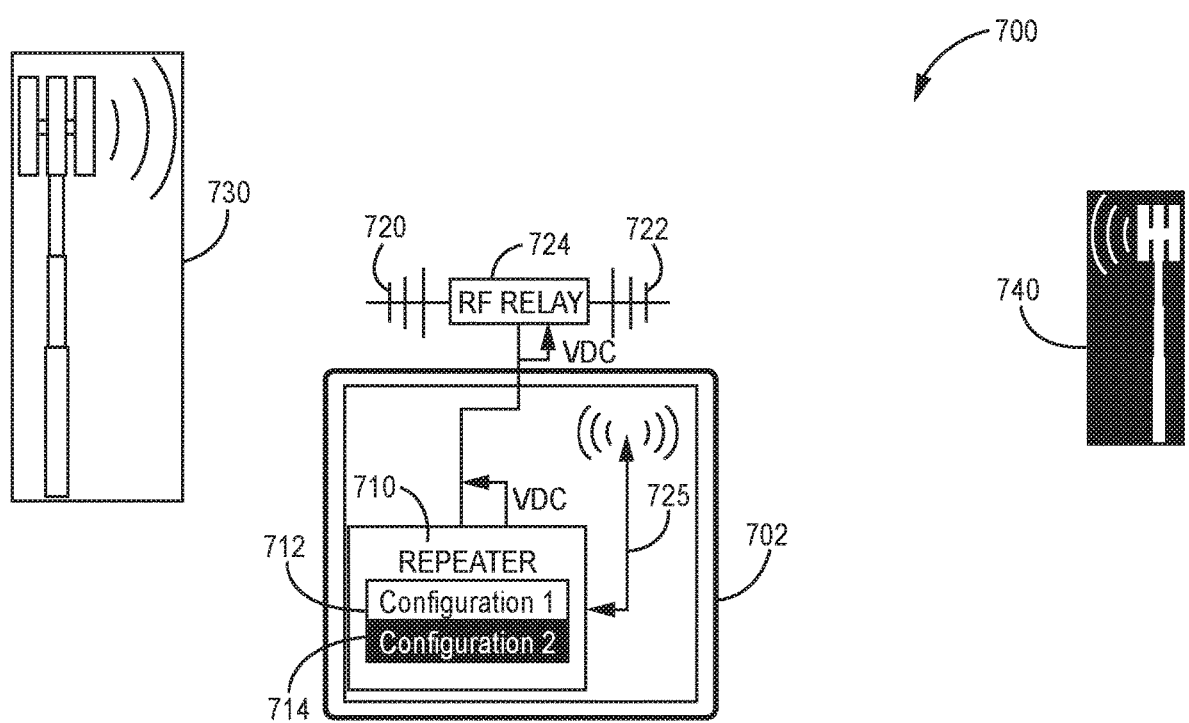
FIG. 7A illustrates another redundant communication system using a relay located outside a building according to one exemplary embodiment.

FIG. 7A illustrates a redundancy communication system 700 of another exemplary embodiment. In redundancy communication system 700, a repeater 710 is housed within a building 702. The repeater 710 includes a primary configuration 712 used to communicate with a primary base station 730 and a secondary configuration 714 used to communicate with a secondary base station 740. In this example embodiment, two antennas are also used. A first antenna 720 is directed to communicate with the primary base station 730 and a second antenna 722 is directed to communicate the secondary base station 740. A Radio Frequency (RF) relay 724 provides communications from the repeater 710 to either the first antenna 720 or the second antenna 722. The relay 724 in this example is located outside of the building 702. In the example of FIG. 7A, the primary base station 730 is offline. In this situation, the repeater 710 switches the relay 724 to the second antenna 722 and implements the secondary configuration 714, as indicated by configuration indication 725, to communicate with the secondary base station 740. In one embodiment, the relay 724 is switched by Direct Current (DC) signal from the repeater 710 that is feed through the signal line to the relay 724 when a condition is met that indicates the switching between base stations.

Figure 7B:
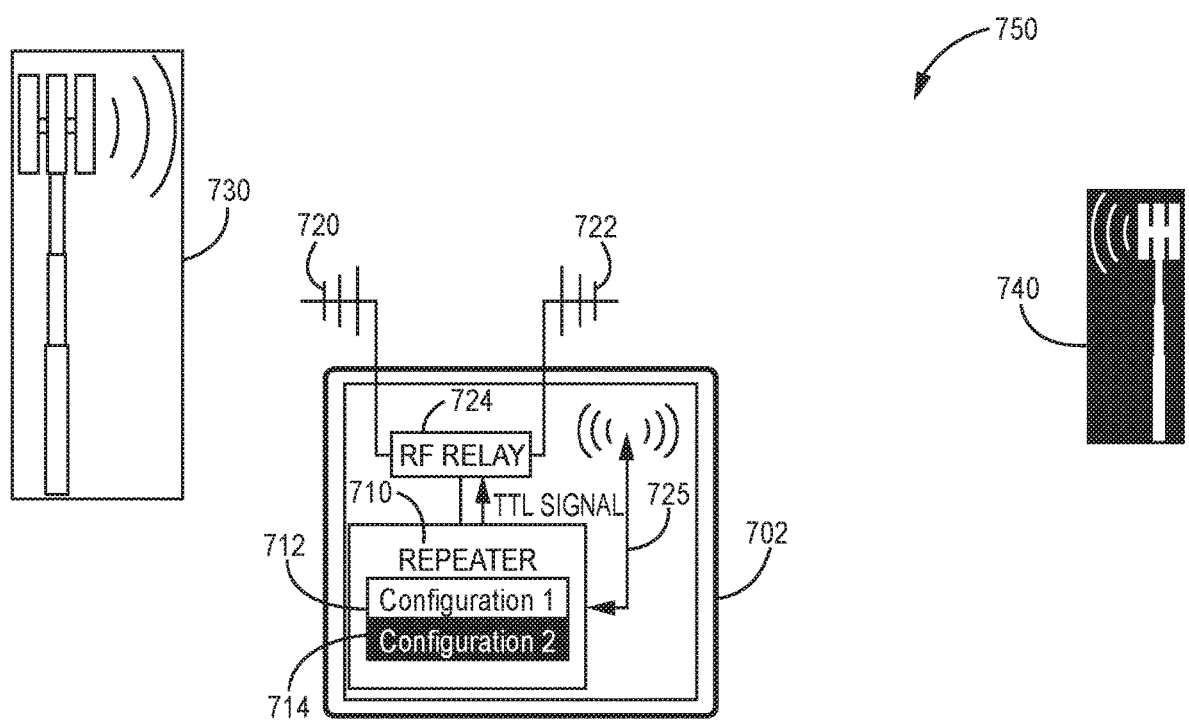
FIG. 7B illustrates another redundant communication system using a relay located inside a building according to one exemplary embodiment.

FIG. 7B illustrates a redundancy communication system 750 of another exemplary embodiment. In redundancy communication system 750, a repeater 710 is housed within a building 702. The repeater 710 includes a first configuration 712 used to communicate with a primary base station 730 and a secondary configuration 714 used to communicate with a secondary base station 740. In this example embodiment, two antennas are also used. A first antenna 720 is directed to communicate with the primary base station 730 and a second antenna 722 is directed to communicate the secondary base station 740. A RF relay 724 provides communications from the repeater 710 to either the first antenna 720 or the second antenna 722. The relay in this example is located inside the building 702.

In the Example of FIG. 7B the primary base station 730 is offline. In this situation, the repeater 710 switches the relay 724 to the second antenna 722 and implements the secondary configuration 714, as indicated by configuration indication 725, to communicate with the secondary base station 740. In one embodiment, the inside relay 724 is switched by a Transistor-Transistor Logic (TTL) signal provided by the repeater 750. With the embodiment of FIG. 7B, it is possible to switch from one signal line to the other without the deterioration of the signal quality (e.g. caused by broken cables). In another embodiment, an individual control line is used for switching of the RF relay. In another example embodiment a fixed voltage is used to switch the RF relay 724 which may be directly fed into the signal line, e.g. using a bias-tee. This method of controlling the RF relay 724 in the repeater 710 helps to overcome long distances in the building without the requirement of using additional cables.

Figure 7C:
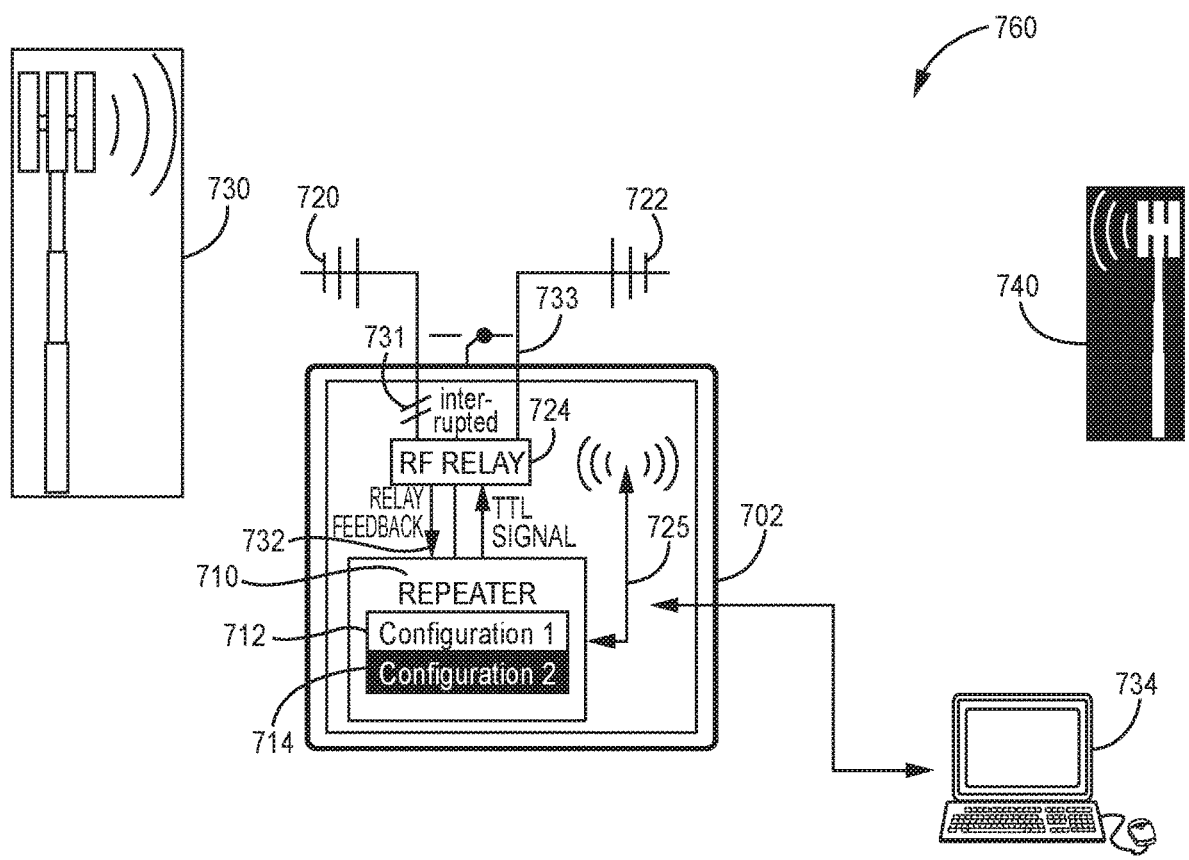
FIG. 7C illustrates another redundant communication system with a relay and feedback implementing a secondary configuration according to one exemplary embodiment.

FIG. 7C illustrates a redundancy communication system 760 of yet another exemplary embodiment. In redundancy communication system 760, a repeater 710 is housed within a building 702. The repeater 710 includes a first configuration 712 used to communicate with a primary base station 730 and a secondary configuration 714 used to communicate with a secondary base station 740. In this example embodiment, two antennas are also used. A first antenna 720 is used to communicate with the primary base station 730 and a second antenna 722 is used to communicate the secondary base station 740. A RF relay 724 provides communications from the repeater 710 to either the first antenna 720 or the second antenna 722. The relay in this example is located inside the building 702. In the Example of FIG. 7C a relay feedback is provided to the repeater 710. Moreover, a remote administrative interface 734 is in communication with the repeater 710. Hence, the relay position can be communicated to the remote administrative interface 734. In an embodiment, the remote administrative interface 734 may control functions of the repeater 710 via implementing either the primary configuration 712 or the secondary configuration 714 and the RF relay 724.

In the example of FIG. 7C a primary signal line 731 from the RF relay 724 to the first antenna 720 is interrupted as illustrated. Hence, the primary base station 730 is unavailable. In this situation, the repeater 710 switches the relay 724 to the second antenna 722 and implements the secondary configuration 714, as indicated by configuration indication 725, to communicate with the secondary base station 740. In one embodiment, the inside relay 724 is switched by a TTL signal provided by the repeater 710. Further in an embodiment, under normal conditions, the RF relay 724 including the primary and secondary lines 731 and 733 are tested to determine if any conditions are present which would require the changing of the base station. If such a condition is detected, in an embodiment, an alarm is communicated to the remote administrative interface 734.

In an embodiment, the state of the RF relay 724 is supervised by the repeater 710. In this embodiment, a controller of the repeater implementing instructions sends out an additional relay alarm if a RF relay status detected by the RF relay supervision is not equivalent to a directed switching condition. The relay alarm may be a signal light on the repeater 710 or in a remote administration interface 734 which provides a service status overview of the specific building 702. With this embodiment, it is possible to provide a clear indication about the radio signal condition in the building 702, even from a remote location. This embodiment allows to detect any abnormal condition in both the primary and secondary signal lines before an abnormal condition on the primary base station occurs thus allowing for a preemptive correction of any hardware failures inside the installation. Using the remote administration interface 734 in addition allows a preemptive switching from one base station to another if a maintenance condition is being announced.

Figure 7D:
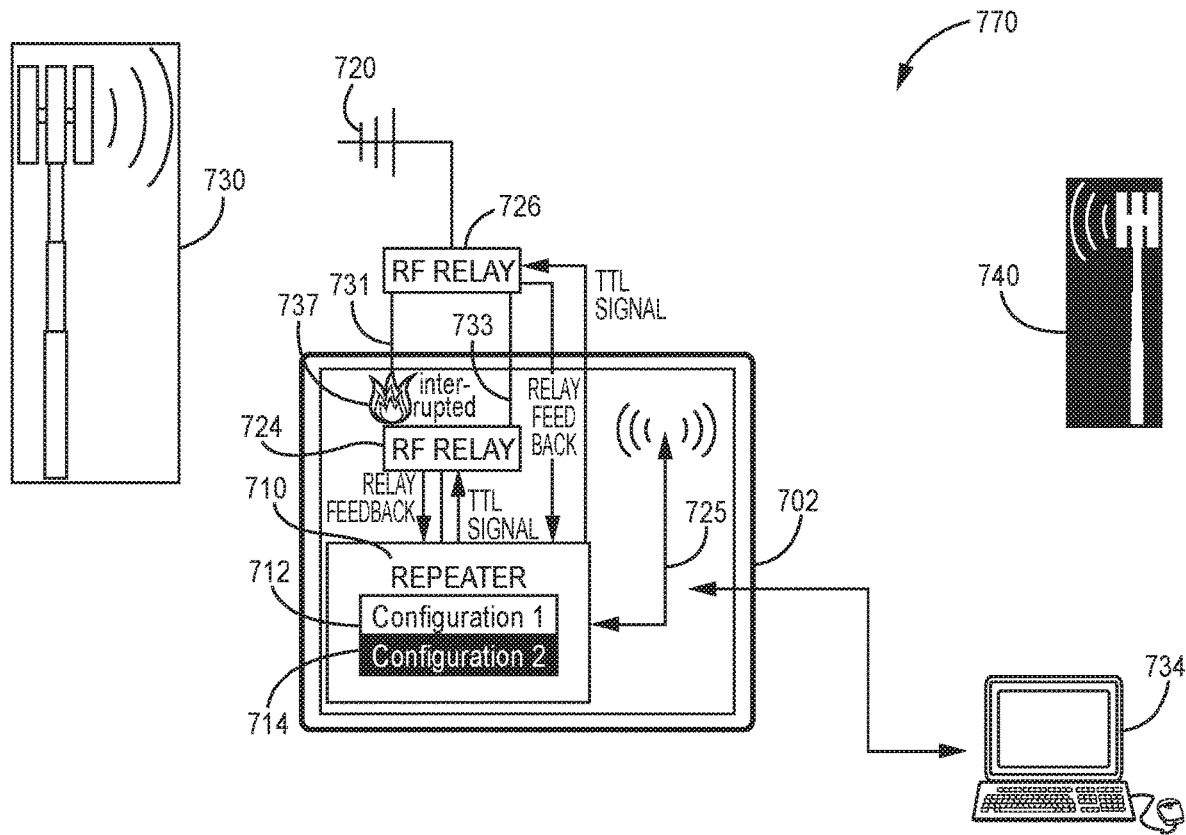
FIG. 7D illustrates another redundant communication system with a pair of relays implementing a secondary configuration according to one exemplary embodiment.

FIG. 7D illustrates a redundancy communication system 770 of yet another exemplary embodiment. In redundancy communication system 770, a repeater 710 is housed within a building 702. The repeater 710 includes a first configuration 712 used to communicate with a primary base station 730 and a secondary configuration 714 used to communicate with a secondary communication link that may or may not include the secondary base station 740. In this example embodiment, one antenna 720 is used to communicate with both the primary and secondary base stations 730 and 740. This embodiment further includes two RF relays. A first RF relay 724 is in communication with the repeater 710. The second RF relay 726 is in communication with the antenna 720. A signal line coupled between a first node of the first relay 724 and a first node of the second relay 726 form a primary communication line 731 and a signal line coupled between a second node of the first relay 724 and a second node of the second relay 726 form a secondary communication line 733. The primary and secondary communication lines 731 and 733 provide redundant communication links between the first and second RF relays 724 and 726. In this example, the first RF relay 724 is located within the building 702 and the second RF relay 726 is located outside the building 702. Both relays 724 and 726 is this embodiment provides relay feed back to the repeater 710. Moreover, in this example embodiment, the RF relays 724 and 726 are activated with a TTL signal.

The embodiment of FIG. 7D also includes a remote administrative interface 734 that is in communication with the repeater 710. Hence, the relay position can be communicated to the remote administrative interface 734. In an embodiment, the remote administrative interface 734 may control functions of the repeater 710 via implementing either the first configuration 712 or the secondary configuration 714 and the RF relay 724.

In the example of FIG. 7D a fire 737 causes an interruption in the primary communication line 731 from the RF relay 724 to the second RF relay 726. In this example, the first relay has been activated to the use the secondary communication line 733. Further in this example, the primary base station 730 is offline so the secondary configuration is used by the repeater 710 to communicate with the secondary base station 740.

In an embodiment, the second RF relay 726 may be used to provide a full backup of the primary communication signal line 731 via the secondary communication link. In this embodiment, a relay test or a RSSI condition can be used to detect if an abnormal condition is present in the primary communication line 731. If it is detected that an abnormal condition is present in the primary communication line 731 but the primary base station 730 is still operational, the secondary communication line 733 (which is part of the secondary communication link) may be used to provide a communication link between the repeater 710 and the primary base station 730. This is accomplished by enacting a secondary configuration 714 that switches the relays to connect the secondary communication line 733. The secondary configuration 714 in this embodiment will include the same frequency group settings needed for communications with the primary base station 730 but may include different parameters, such as but not limited to, gains to accommodate the changed communication path. The activation can also be initiated manually by help of a remote administration interface 734.

In an embodiment, feedback from the relays is provided to the remote administrative interface 734 which conveys to the remote administrative interface 734 the then current base station configuration being used and the then current configuration of the relays 724 and 726. Further in an embodiment, the remote administrative interface 734 provides an user an option to cause the repeater 710 to automatically switch back to the use of the primary base station 730 and the primary communication line 731 once a normal condition is monitored or a manual switch back at an user's intervention.

In some embodiments, additional features may be applied. For example, while having the first configuration for the first base station active, a cyclic cross check of the availability of the second base station can be performed. This can be done in case one common antenna is used for both base stations. To do so, free filter resources of the DSP can be used to check the RSSI of one (or several) carriers in the background. In the case where the carriers are available, switching is possible. This procedure can also be used to immediately set correct RF parameters (gain, output power, etc.) when activating an additional configuration.

EXAMPLE EMBODIMENTS

Example 1 includes A repeater with redundancy functions for a wireless communication system, the repeater comprising: downlink repeater circuitry to interface communications from base stations to user equipment; uplink repeater circuitry to interface communications from the user equipment to the base stations; a detection function configured to detect conditions of communications between the base stations and the repeater; at least one memory to store a primary configuration that sets out parameters for interfacing communications between the repeater and a primary base station of the base stations and at least one secondary configuration that sets out parameters for interfacing communications between the repeater and at least one secondary base station of the base stations; and a controller configured to implement the at least one secondary configuration to communicate with an associated secondary base station upon the detection function detecting abnormal communications between the repeater and the primary base station.

Example 2 includes the repeater of Example 1, wherein the controller is further configured to implement the primary configuration to restore communications between the repeater and the primary base station upon the detection function detecting a condition that indicates normal communications between the repeater and the primary base station have been restored.

Example 3 includes the repeater of any of Examples 1-2, wherein the primary and secondary configurations include at least one of frequencies, gain, output power and relay status information.

Example 4 includes the repeater of any of Examples 1-3, the controller further configured to communicate with a remote administrative interface.

Example 5 includes a repeater with redundancy functions for a wireless communication system, the repeater comprising: downlink repeater circuitry to interface communications from base stations to user equipment; uplink repeater circuitry to interface communications from the user equipment to the base stations; a detection function configured to detect conditions of communications between the base stations and the repeater; at least one memory to store a primary configuration that sets out parameters for interfacing communications between the repeater and a primary base station of the base stations along a primary communication link and at least one secondary configuration that set out parameters for interfacing communications between the repeater and the primary base station along a secondary communication link; and a controller configured to implement the at least one secondary configuration to communicate with the primary base station along the secondary communication link upon the detection function detecting abnormal communications on the primary communication link.

Example 6 includes the repeater of Example 5, wherein the at least one secondary configurations include at least one of gains, output power and relays status.

Example 7 includes the repeater of any of Examples 5-6, wherein the controller is further configured to implement another secondary configuration to establish communication between the repeater and a secondary base station upon the detection function detecting abnormal communications between the repeater and the primary base station.

Example 8 includes the repeater of Example 7, wherein the another secondary configuration includes at least one of frequencies, gains, output power and relays status.

Example 9 includes a wireless communication system having redundancy functions, the communication system comprising: a primary base station; at least one secondary base station; a repeater, the repeater including, downlink repeater circuitry to interface communications from one of the primary base station and the at least one secondary base station to user equipment, uplink repeater circuitry to interface communications from the user equipment to one of the primary base station and the at least one secondary base station, a detection function configured to detect conditions of communications between the repeater and the primary base station and the repeater and at least one secondary base station, at least one memory to store a primary configuration and at least one secondary configuration, the primary configuration setting out parameters for interfacing communications between the repeater and the primary base station and the at least one secondary configuration setting out parameters for interfacing communications between the repeater and the at least one secondary base station, and a controller configured to implement the at least one secondary configuration upon the detection function detecting abnormal communications between the repeater and the primary base station; at least one antenna to receive and transmit communications between the repeater and the primary base station and the repeater and the at least one secondary base station; and at least one communication link communicatively coupling the at least one antenna to the repeater.

Example 10 includes the communication system of Example 9, further comprising: the at least one antenna including a primary antenna and a secondary antenna, the primary antenna directed to communicate with the primary base station and the secondary antenna directed to communicate with the at least one secondary base station; and a splitter coupling the at least one communication link to the primary antenna and the secondary antenna.

Example 11 includes the communication system of any of Examples 9-10, further comprising: the at least one antenna including a primary antenna and a secondary antenna, the primary antenna directed to communicate with the primary base station and the secondary antenna directed to communicate with the at least one secondary base station; and at least one relay selectively coupling the at least one communication link to one of the primary antenna and the secondary antenna.

Example 12 includes the communication system of Example 11, wherein the at least one relay is located at one of inside a building housing the repeater and outside the building housing the repeater.

Example 13 includes the communication system of any of Examples 11-12, further comprising: a relay feedback in communication with the controller.

Example 14 includes the communication system of any of Examples 9-13, further comprising: a remote administrative interface in communication with the controller of the repeater, the controller further configured to share current configuration information of the repeater with the remote administrative interface, the controller further configured to implement at least one of the primary configuration and the at least one secondary configuration based on an input from the remote administrative interface.

Example 15 includes the communication system of any of Examples 9-14, further comprising: a first relay; and a second relay, the at least one communication link including a first communication link coupled between a first node of the first relay and a first node of the second relay and a second communication link coupled between a second node of the first relay and a second node of the second relay, the first relay coupled to the repeater and the second relay coupled to the at least one antenna.

Example 16 includes the communication system of Example 15, wherein the implementing the at least one secondary configuration switches the first and second relays to couple the repeater to the at least one antenna via the second communication link.

Example 17 includes the communication system of any of Examples 9-16, wherein implementing the at least one secondary configuration causes the repeater to communicate with the at least one secondary base station.

Example 18 includes the communication system of any of Examples 9-16, wherein the controller is further configured to automatically implement the primary configuration upon the detection function detecting a normal communication condition between the repeater and the primary base station.

Example 19 includes a method of providing redundancy in a wireless communication system, the method comprising: monitoring communications between a repeater and a primary base station of the wireless communication system; implementing a secondary configuration with the repeater upon detection of a switching condition indicating abnormal communications between the repeater and the primary base station; and establishing communications between the repeater and the wireless communication system via second communication link upon the implementation of the secondary configuration.

Example 20 includes the method of Example 19, wherein detection of the switching condition further comprises: measuring a communication signal; and comparing the measured communication signal with a set threshold.

Example 21 includes the method of Example 20, wherein the measurement of the communication signal includes at least one of a received signal strength indicator measurement, a voltage standing wave radio measurement and a signal-to-noise-ratio measurement.

Example 22 includes the method of any of Examples 19-21, wherein detection of the switching condition includes at least one of determining a relay status and the status of a primary signal line.

Example 23 includes the method of any of Examples 19-22, further comprising: switching communications back to the primary base station by enacting a primary configuration with the repeater upon detection of a normal communication condition with the primary base station.

Example 24 includes the method of Example 23, further comprising wherein switching between the primary configuration and the secondary configuration is done by one of an automatic switch, a manual switch and a combination of an automatic switch and a manual switch.

Example 25 includes the method of any of Examples 19-24, wherein the second communication link includes a secondary base station and the secondary configuration includes frequencies and gains used by the secondary base station.

Example 26 includes the method of Example 25, further comprising: monitoring communications between the repeater and the secondary base station; switching communications from the secondary base station to another secondary base station upon detection of abnormal communications between the repeater and the secondary base station by implementing another second configuration associated with the another secondary base station.

Example 27 includes the method of Example 26, further comprising: ranking secondary base stations to set an order of activation.

Example 28 includes the method of Example 27, further comprising: activating a higher ranked secondary base station by implementing an associated secondary configuration with the repeater when communication between the repeater and the higher ranked secondary base station is determined to be normal.

Example 29 includes the method of any of Examples 26-28, further comprising: determining additional parameters to include in at least one of the secondary configuration and a primary configuration based on the monitoring of at least one of the communications between the repeater and the primary base station and the repeater and the secondary base station.

Example 30 includes the method of any of Examples 19-29, further comprising: communicating configuration information of the repeater to a remote administrative interface.

Example 31 includes the method of Example 30, further comprising: controlling remotely at least in part the repeaters implementation of the secondary configuration and a primary configuration.

Example 32 includes the method of any of Examples 19-31, further comprising: monitoring the status of a communication link between a repeater and a primary base station and the second communication link while the communication link between a repeater and a primary base station and the second communication link are not active.

Example 33 includes a method of operating a redundancy wireless communication system, the method comprising: monitoring communications between a repeater and a primary base station of the wireless communication system; implementing a secondary configuration with the repeater upon detection of a switching condition indicating abnormal communications between the repeater and the primary base station on a primary commutation line; and establishing communications between the repeater and the primary base station pursuant to the implementation of the secondary configuration by the repeater using a secondary communication line.

Example 34 includes the method of Example 33, wherein implementing the secondary configuration with the repeater further comprises: switching a pair of relays to connect the secondary communication line between the repeater and an antenna.

Example 35 includes the method of any of Examples 33-34, further comprising: activating the relays with a transistor-transistor logic signal; and providing a relay feedback for each relay to the repeater to verify the status of the relays.

Example 36 includes the method of Example 35, further comprising: communicating the status of the relays to a remote administrative interface.

Example 37 includes the method of any of Examples 33-36, further comprising: implementing another secondary configuration with the repeater to establish communications between the repeater and a secondary base station upon detecting a switching condition that indicates communication between the repeater and the primary base station is abnormal.

Example 38 includes the method of Example 37, wherein the another secondary configuration includes information relating to at least one of frequencies, gains, output status and relay configurations.

Example 39 includes the method of any of Examples 37-38, further comprising: switching back to communication with the primary base station upon an indication that communications between the repeater and the base station has returned to normal; and switching back to primary communication line upon an indication that communications through the primary communication line has returned to normal.

Example 40 includes the method of Example 39, wherein switching communications between the primary communication line and the secondary communication line is done by one of an automatic switch, a manual switch and a combination of an automatic switch and a manual switch.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A repeater with redundancy functions for a wireless communication system, the repeater comprising:
   downlink repeater circuitry to interface communications from base stations to user equipment;
   uplink repeater circuitry to interface communications from the user equipment to the base stations;
   a detection function configured to detect conditions of communications between the base stations and the repeater;
   at least one memory to store a primary configuration that sets out parameters for interfacing communications between the repeater and a primary base station of the base stations and at least one secondary configuration that sets out parameters for interfacing communications between the repeater and at least one secondary base station of the base stations, wherein the parameters include a first frequency and first gain used for interfacing communications between the repeater and the primary base station and a second different frequency and second gain used for interfacing communications between the repeater and the secondary base station; and
   a controller configured to implement the at least one secondary configuration to communicate with an associated secondary base station upon the detection function detecting abnormal communications between the repeater and the primary base station.

2. The repeater of claim 1, wherein the controller is further configured to implement the primary configuration to restore communications between the repeater and the primary base station upon the detection function detecting a condition that indicates normal communications between the repeater and the primary base station have been restored.

3. The repeater of claim 1, wherein the primary and secondary configurations further include at least one of output power and relay status information.

4. The repeater of claim 1, the controller further configured to communicate with a remote administrative interface that allows remote implementation of the at least one secondary configuration.

5. A repeater with redundancy functions for a wireless communication system, the repeater comprising:
   downlink repeater circuitry to interface communications from base stations to user equipment;
   uplink repeater circuitry to interface communications from the user equipment to the base stations;
   a detection function configured to detect conditions of communications between the base stations and the repeater;
   at least one memory to store a primary configuration that sets out parameters for interfacing communications between the repeater and a primary base station of the base stations along a primary communication link and at least one secondary configuration that set out parameters for interfacing communications between the repeater and the primary base station along a secondary communication link, wherein at least a portion of the primary communication link and a portion of the secondary communication link extend through two independent paths in a building, wherein the parameters of the primary and second configurations include at least gains associated with the respective primary communication link and the secondary communication link; and
   a controller configured to implement the at least one secondary configuration to communicate with the primary base station along the secondary communication link upon the detection function detecting abnormal communications on the primary communication link.

6. The repeater of claim 5, wherein the at least one secondary configurations include at least one of output power and relays status.

7. The repeater of claim 5, wherein the controller is further configured to implement another secondary configuration to establish communication between the repeater and a secondary base station upon the detection function detecting abnormal communications between the repeater and the primary base station.

8. The repeater of claim 7, wherein the another secondary configuration includes at least one of frequencies, output power and relays status.

9. A wireless communication system having redundancy functions, the communication system comprising:
   a primary base station;
   at least one secondary base station;
   a repeater, the repeater including,
      downlink repeater circuitry to interface communications from one of the primary base station and the at least one secondary base station to user equipment, uplink repeater circuitry to interface communications from the user equipment to one of the primary base station and the at least one secondary base station, a detection function configured to detect conditions of communications between the repeater and the primary base station and the repeater and at least one secondary base station, at least one memory to store a primary configuration and at least one secondary configuration, the primary configuration setting out parameters for interfacing communications between the repeater and the primary base station and the at least one secondary configuration setting out parameters for interfacing communications between the repeater and the at least one secondary base station, a controller configured to implement the at least one secondary configuration upon the detection function detecting abnormal communications between the repeater and the primary base station;

at least one antenna to receive and transmit communications between the repeater and the primary base station and the repeater and the at least one secondary base station, the at least one antenna including a primary antenna and a secondary antenna, the primary antenna directed to communicate with the primary base station and the secondary antenna directed to communicate with the at least one secondary base station;

at least one communication link communicatively coupling the at least one antenna to the repeater; and at least one relay selectively coupling the at least one communication link to one of the primary antenna and the secondary antenna.

10. The communication system of claim 9, further comprising:

the at least one antenna including a primary antenna and a secondary antenna, the primary antenna directed to communicate with the primary base station and the secondary antenna directed to communicate with the at least one secondary base station; and a splitter coupling the at least one communication link to the primary antenna and the secondary antenna.

11. The communication system of claim 9, wherein the at least one relay is located at one of inside a building housing the repeater and outside the building housing the repeater.

12. The communication system of claim 9, further comprising:

a relay feedback in communication with the controller.

13. The communication system of claim 9, wherein the at least one relay further comprises:

a first relay; and a second relay, the at least one communication link including a first communication link coupled between a first node of the first relay and a first node of the second relay and a second communication link coupled between a second node of the first relay and a second node of the second relay, the first relay coupled to the repeater and the second relay coupled to the at least one antenna.

14. The communication system of claim 13, wherein the implementing the at least one secondary configuration switches the first and second relays to couple the repeater to the at least one antenna via the second communication link.

15. The communication system of claim 9, wherein implementing the at least one secondary configuration causes the repeater to communicate with the at least one secondary base station.

16. The communication system of claim 9, wherein the controller is further configured to automatically implement the primary configuration upon the detection function detecting a normal communication condition between the repeater and the primary base station.

17. A communication system comprising:

a primary base station;

at least one secondary base station;

a repeater, the repeater including, downlink repeater circuitry to interface communications from one of the primary base station and the at least one secondary base station to user equipment, uplink repeater circuitry to interface communications from the user equipment to one of the primary base station and the at least one secondary base station, a detection function configured to detect conditions of communications between the repeater and the primary base station and the repeater and at least one secondary base station, at least one memory to store a primary configuration and at least one secondary configuration, the primary configuration setting out parameters for interfacing communications between the repeater and the primary base station and the at least one secondary configuration setting out parameters for interfacing communications between the repeater and the at least one secondary base station, and a controller configured to implement the at least one secondary configuration upon the detection function detecting abnormal communications between the repeater and the primary base station;

at least one antenna to receive and transmit communications between the repeater and the primary base station and the repeater and the at least one secondary base station;

at least one communication link communicatively coupling the at least one antenna to the repeater; and a remote administrative interface in communication with the controller of the repeater, the controller further configured to share current configuration information of the repeater with the remote administrative interface, the controller further configured to implement at least one of the primary configuration and the at least one secondary configuration based on an input from the remote administrative interface.

18. A method of providing redundancy in a wireless communication system, the method comprising:

monitoring communications between a repeater and a primary base station of the wireless communication system through a first communication link;

implementing a secondary configuration with the repeater upon detection of a switching condition indicating abnormal communications between the repeater and the primary base station;

establishing communications between the repeater and the wireless communication system via second communication link upon the implementation of the secondary configuration, wherein the second communication link includes a secondary base station and the secondary configuration includes frequencies and gains used by the secondary base station.

19. The method of claim 18, wherein detection of the switching condition further comprises:

measuring a communication signal; and comparing the measured communication signal with a set threshold.

20. The method of claim 19, wherein the measurement of the communication signal includes at least one of a received signal strength indicator measurement, a voltage standing wave radio measurement and a signal-to-noise-ratio measurement.

21. The method of claim 18, wherein detection of the switching condition includes at least one of determining a relay status and the status of a primary signal line.

22. The method of claim 18, further comprising:
switching communications back to the primary base station by enacting a primary configuration with the repeater upon detection of a normal communication condition with the primary base station.

23. The method of claim 22, further comprising wherein switching between the primary configuration and the secondary configuration is done by one of an automatic switch, a manual switch and a combination of an automatic switch and a manual switch.

24. The method of claim 18, further comprising:
monitoring communications between the repeater and the secondary base station;
switching communications from the secondary base station to another secondary base station upon detection of abnormal communications between the repeater and the secondary base station by implementing another second configuration associated with the another secondary base station.

25. The method of claim 24, further comprising:
ranking secondary base stations to set an order of activation.

26. The method of claim 25, further comprising:
activating a higher ranked secondary base station by implementing an associated secondary configuration with the repeater when communication between the repeater and the higher ranked secondary base station is determined to be normal.

27. The method of claim 24, further comprising:
determining additional parameters to include in at least one of the secondary configuration and a primary configuration based on the monitoring of at least one of the communications between the repeater and the primary base station and the repeater and the secondary base station.

28. The method of claim 18, further comprising:
communicating configuration information of the repeater to a remote administrative interface.

29. The method of claim 28, further comprising:
controlling remotely at least in part the repeaters implementation of the secondary configuration and a primary configuration.

30. A method of providing redundancy in a wireless communication system, the method comprising:
monitoring communications between a repeater and a primary base station of the wireless communication system through a first communication link;
implementing a secondary configuration with the repeater upon detection of a switching condition indicating abnormal communications between the repeater and the primary base station;
establishing communications between the repeater and the wireless communication system via second communication link upon the implementation of the secondary configuration; and
monitoring the status of a communication link between a repeater and a primary base station and the second communication link while the communication link between a repeater and a primary base station and the second communication link are not active.

31. A method of operating a redundancy wireless communication system, the method comprising:
monitoring communications between a repeater and a primary base station of the wireless communication system;
implementing a secondary configuration with the repeater upon detection of a switching condition indicating abnormal communications between the repeater and the primary base station on a primary commutation line; and
establishing communications between the repeater and the primary base station pursuant to the implementation of the secondary configuration by the repeater using a secondary communication line.

32. The method of claim 31, wherein implementing the secondary configuration with the repeater further comprises:
switching a pair of relays to connect the secondary communication line between the repeater and an antenna.

33. The method of claim 31, further comprising:
activating the relays with a transistor-transistor logic signal; and
providing a relay feedback for each relay to the repeater to verify the status of the relays.

34. The method of claim 33, further comprising:
communicating the status of the relays to a remote administrative interface.

35. The method of claim 31, further comprising:
implementing another secondary configuration with the repeater to establish communications between the repeater and a secondary base station upon detecting a switching condition that indicates communication between the repeater and the primary base station is abnormal.

36. The method of claim 35, wherein the another secondary configuration includes information relating to at least one of frequencies, gains, output status and relay configurations.

37. The method of claim 35, further comprising:
switching back to communication with the primary base station upon an indication that communications between the repeater and the base station has returned to normal; and
switching back to primary communication line upon an indication that communications through the primary communication line has returned to normal.

38. The method of claim 37, wherein switching communications between the primary communication line and the secondary communication line is done by one of an automatic switch, a manual switch and a combination of an automatic switch and a manual switch.

* * * * *